(12) United States Patent
Seike et al.

(10) Patent No.: US 7,484,730 B2
(45) Date of Patent: Feb. 3, 2009

(54) IMAGE FORMING APPARATUS

(75) Inventors: Toshihiko Seike, Nara (JP); Hideshi Izumi, Nara (JP); Yuhi Akagawa, Kyoto (JP); Tatsuya Shinkawa, Nara (JP)

(73) Assignee: Sharp Kabushiki Kaisha, Osaka-shi (JP)

( * ) Notice: Subject to any disclaimer, the term of this patent is extended or adjusted under 35 U.S.C. 154(b) by 340 days.

(21) Appl. No.: 11/345,224

(22) Filed: Feb. 2, 2006

(65) Prior Publication Data

US 2006/0170950 A1 Aug. 3, 2006

(30) Foreign Application Priority Data

Feb. 3, 2005 (JP) ............................. 2005-028064

(51) Int. Cl.
*B65H 31/20* (2006.01)
(52) U.S. Cl. ..................................... 271/223
(58) Field of Classification Search ................. 271/207, 271/213, 223; 400/680, 647
See application file for complete search history.

(56) References Cited

U.S. PATENT DOCUMENTS 7,070,350 B2 * 7/2006 Inokuchi et al. ............. 400/680

FOREIGN PATENT DOCUMENTS

| JP | 2001-335222 A | 12/2001 |
|---|---|---|
| JP | 2003-335449 A | 11/2003 |
| JP | 2004-338873 A | 12/2004 |

* cited by examiner

*Primary Examiner*—Kaitlin S Joerger
(74) *Attorney, Agent, or Firm*—Birch, Stewart, Kolasch & Birch, LLP

(57) ABSTRACT

Pyrazolo-quinazoline derivatives of formula (Ia) or (Ib) as defined in the specification, and pharmeceutically acceptable salts thereof, process for their preparation and pharmaceutical composition comprising them are disclosed; the compounds of the invention maybe useful in therapy, in the treatment of diseases associated with a disregulated protein kinase activity, like cancer.

11 Claims, 8 Drawing Sheets

IMAGE FORMING APPARATUS

BACKGROUND OF THE INVENTION

This application claims priority under 35 U.S.C. § 119(a) on Patent Application No. 2005-28064 filed in Japan on Feb. 3, 2005, the entire contents of which are hereby incorporated by reference.

The present invention relates to an image forming apparatus provided with a paper post-processing portion.

In recent years, as image forming apparatuses come to have multiple functions, development of paper post-processing apparatuses that perform post-processing for printed paper has been advancing. Examples of functions of such paper post-processing apparatuses include a staple function, a hole-punching function, and a binding function. However, a processing mechanism for any paper post-processing apparatus having such functions has been enlarged. Thus, when a compact image forming apparatus is provided with a paper post-processing apparatus, it is necessary to dispose the paper post-processing apparatus outside the image forming apparatus.

Disposing the paper post-processing apparatus outside the image forming apparatus in this manner leads to the problem not only that the area occupied by the apparatus as a whole increases but also that the electric power consumption of the apparatus as a whole increases. For example, with an electrical wiring specification generally adopted in Japan (outlet wiring: 100V, 15A), there is the possibility that the rated electric power is exceeded. In this case, the trouble is caused that it is necessary to separately wire the image forming apparatus and the paper post-processing apparatus.

Thus, a technique has been proposed in which a paper post-processing apparatus itself is designed so as to be compact, and the paper post-processing apparatus is disposed within a space formed in an image forming apparatus instead of disposing it outside the image forming apparatus (see JP 2003-335449A, for example). More specifically, the paper post-processing apparatus is disposed using a space formed by an original reading portion, a printing portion, and a paper-feed portion in order to solve the above-described problems.

On the other hand, in the image forming apparatus provided with such a conventional paper post-processing apparatus as described above, a configuration is adopted in which a discharge tray portion that can be extended or retracted is disposed on the downstream side of the paper post-processing apparatus, and the discharge tray portion is used as a paper holding portion for staple processing when staple processing is performed with the paper post-processing apparatus.

Furthermore, with this retractable discharge tray portion, unless the discharge tray portion is used in an extended state, discharged paper cannot be placed on the discharge tray portion and the paper falls from the discharge tray portion, depending on the types (large size such as B4 and A3, for example) of paper to be discharged. More specifically, when staple processing is performed for paper of a large size, if the discharge tray portion is retracted, then the problem is caused not only that paper falls but also that the staple processing cannot be performed.

SUMMARY OF THE INVENTION

The present invention was devised in order to solve the above-described problems of conventional techniques, and an object thereof is to provide an image forming apparatus in which paper after printing is reliably prevented from falling from a discharge tray portion and staple processing can be reliably performed, by performing print processing after confirming an extended/retracted state of the discharge tray portion, based on the request contents when a print request has been made.

In order to solve the above-described problems, an image forming apparatus according to the present invention is an image forming apparatus having a configuration in which an original reading portion is disposed in an upper portion of an apparatus main body, a paper-feed portion is disposed in a lower portion of the apparatus main body, a printing portion is disposed between the original reading portion and the paper-feed portion, a paper post-processing portion is disposed in a space portion of the apparatus main body formed by the original reading portion, the printing portion, and the paper-feed portion, and a discharge tray portion that can be extended and retracted, to which recording paper after post-processing is discharged, is disposed on the downstream side of the paper post-processing portion, wherein a control portion performs print processing after confirming an extended/retracted state of the discharge tray portion, based on the type of recording paper that is to be used and presence/absence of a request for post-processing by the paper post-processing portion, when a print request has been made. Herein, the apparatus main body refers to the portions in the image forming apparatus other than the paper post-processing portion and the discharge tray portion.

More specifically, the control portion is configured so as to confirm an extended/retracted state of the discharge tray portion when the type of recording paper that is to be used is the paper size with which it is necessary to extend the discharge tray portion. Furthermore, the control portion is configured so as to confirm an extended/retracted state of the discharge tray portion when a request for post-processing by the paper post-processing portion is a request for staple processing. A configuration is adopted in which a warning portion gives warning so as to extend the discharge tray portion when a result of the confirmation shows that the discharge tray portion is retracted. Herein, as the method for giving warning, a method by which a warning message is displayed on a crystal liquid display panel provided on the apparatus main body, a method for letting an LED or other components flicker (or operate), and a method for sounding an electronic buzzer, for example, are conceivable. By giving such warning, a user can extend the discharge tray portion before printing is started.

In this case, a configuration may be adopted in which an extended/retracted state of the discharge tray portion is confirmed based on a detection signal from an extension/retraction detection sensor for detecting extension/retraction of the discharge tray portion. Furthermore, a paper detection sensor for detecting presence/absence of recording paper, which has been conventionally disposed on the discharge tray portion, may be used also as the extension/retraction detection sensor. By using the paper detection sensor also for this purpose, it is possible to suppress an increase in the number of components and a complexity of the configuration.

DESCRIPTION OF THE PREFERRED EMBODIMENTS

Hereinafter, embodiments of the present invention are described with reference to the drawings.

Figure 1:
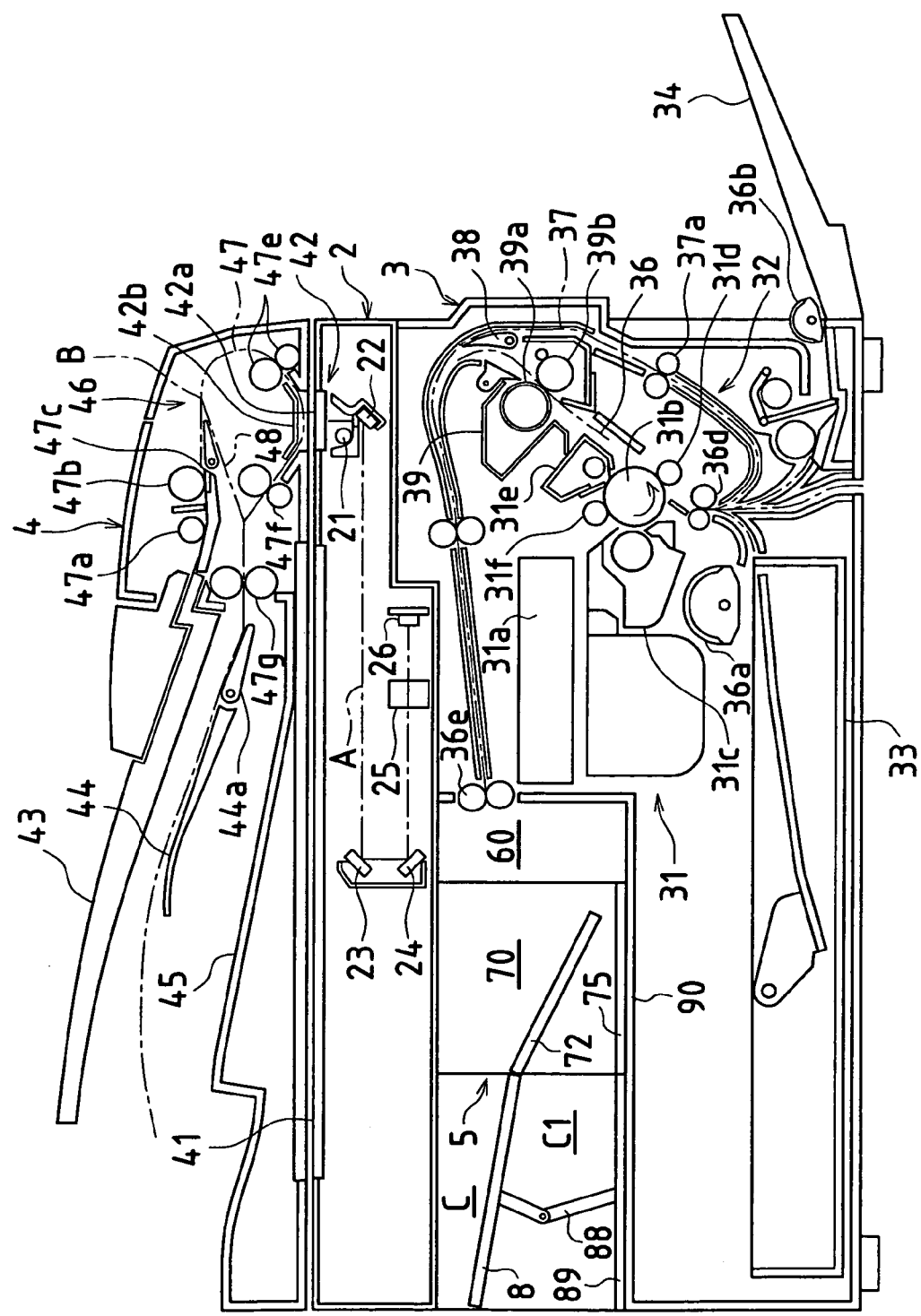
FIG. 1 is a view showing a schematic configuration of a compound machine in which the present invention is applied.

In this embodiment, a case is described in which an image forming apparatus provided with a paper post-processing portion according to the present invention is applied in a compound machine. FIG. 1 shows the outline of the internal configuration of the compound machine. First, the overall configuration of the compound machine is described.

As shown in FIG. 1, a compound machine 1 is provided with a scanner portion 2 as image reading means, an image forming portion 3, an original automatic feed portion 4, and a paper post-processing portion 5 as paper post-processing means. It should be noted that for the sake of convenience, the portions in the compound machine 1 other than the paper post-processing portion 5 and a discharge tray 8 are referred to as an "apparatus main body".

The compound machine 1 has a copier mode, a printer mode, and a FAX mode as image forming modes in which an image is formed on recording paper (including recording media such as OHP) and the modes are selected by a user. Hereinafter, components of the compound machine 1 are described, and then operation in print processing according to the present invention is described.

Description of the Scanner Portion 2

The scanner portion 2 is a portion that creates original image data by reading an image of an original that has been placed on an original stage 41 made of transparent glass, for example, or an image of originals that are fed page by page from the original automatic feed portion 4. This scanner portion 2 is provided with an exposing light source 21, a plurality of reflecting mirrors 22, 23, and 24, an imaging lens 25, and a photoelectric transducer (CCD: charge coupled device) 26.

The exposing light source 21 irradiates light to an original that has been placed on the original stage 41 of the original automatic feed portion 4 or an original that is transported from the original automatic feed portion 4. As shown in FIG. 1 in which an optical path is indicated by the dashed dotted line A, the reflecting mirrors 22, 23, and 24 reflect reflected light from the original in the leftward direction in FIG. 1, then reflect that light downward, then reflect that light in the rightward direction in FIG. 1 toward the imaging lens 25.

There are the following two original image reading operations. On the one hand, when reading an original that has been placed on the original stage 41 (when used as a "sheet fixing system"), the exposing light source 21 and the reflecting mirrors 22, 23, and 24 scan in the horizontal direction along the original stage 41, and read an image of the entire original. On the other hand, when reading an original that is transported from the original automatic feed portion 4 (when used as a "sheet moving system"), the exposing light source 21 and the reflecting mirrors 22, 23, and 24 are fixed in the positions shown in FIG. 1, and an image is read when the original passes an original reading portion 42 of the original automatic feed portion 4 described below.

Light that has been reflected by the reflecting mirrors 22, 23, and 24 and has passed the imaging lens 25 is guided to the photoelectric transducer 26, and the reflected light is converted to an electrical signal (original image data) in this photoelectric transducer 26.

Description of the Image Forming Portion 3

The image forming portion 3 is provided with an image forming system 31 as printing means, and a paper transport system 32.

The image forming system 31 is provided with a laser scanning unit 31a and a photosensitive drum 31b as a drum-type image carrier. The laser scanning unit 31a irradiates the surface of the photosensitive drum 31b with laser light based on the original image data that has been converted in the photoelectric transducer 26, or image data that has been input from an external terminal apparatus, for example. The photosensitive drum 31b rotates in the direction indicated by the arrow in FIG. 1, and by laser light from the laser scanning unit 31a being irradiated, an electrostatic latent image is formed on the surface of the photosensitive drum 31b.

In addition to the laser scanning unit 31a, a development unit (development mechanism) 31c, an unshown transfer unit (transfer mechanism) having a transfer roller 31d, a cleaning unit (cleaning mechanism) 31e, an unshown charge removal device, and an unshown charging unit (charging mechanism) having a charging roller 31f are arranged in order in the circumferential direction around the outer circumference of the photosensitive drum 31b.

The development unit 31c develops the electrostatic latent image that has been formed on the surface of the photosensitive drum 31b into a visible image with toner (manifesting agent). The transfer roller 31d transfers the toner image that has been formed on the surface of the photosensitive drum 31b to recording paper as a recording medium. The cleaning unit 31e removes toner remaining on the surface of the photosensitive drum 31b after toner transfer. The charge removal device removes an electrical charge remaining on the surface of the photosensitive drum 31b. The charging roller 31f charges the surface of the photosensitive drum 31b to a predetermined potential before an electrostatic latent image is formed.

When an image is formed on recording paper, the surface of the photosensitive drum 31b is charged to a predetermined potential by the charging roller 31f, and the laser scanning unit 31a irradiates the surface of the photosensitive drum 31b with laser light based on the original image data. Subsequently, the development unit 31c develops a visible image with toner on the surface of the photosensitive drum 31b, and the toner image is transferred to the recording paper by the transfer roller 31d. Subsequently, the toner remaining on the surface of the photosensitive drum 31b is removed by the cleaning unit 31e, and the electrical charge remaining on the surface of the photosensitive drum 31b is removed by the charge removal device. Accordingly, one cycle of the image forming operation (print operation) on recording paper is concluded. It is possible to successively form images on a plurality of pages of recording paper by repeating this cycle.

On the other hand, the paper transport system 32 allows the image forming system 31 to form an image by page by page transporting recording paper accommodated in the paper cassette 33 as feed means or recording paper placed on the manual tray 34, and discharges the recording paper on which an image has been formed, via the paper post-processing portion 5 described below, to the discharge tray 8 as discharge means. The discharge tray 8 is provided above the paper cassette 33 and below the scanner portion 2. A detailed description of the discharge tray 8 is given below.

Figure 2:
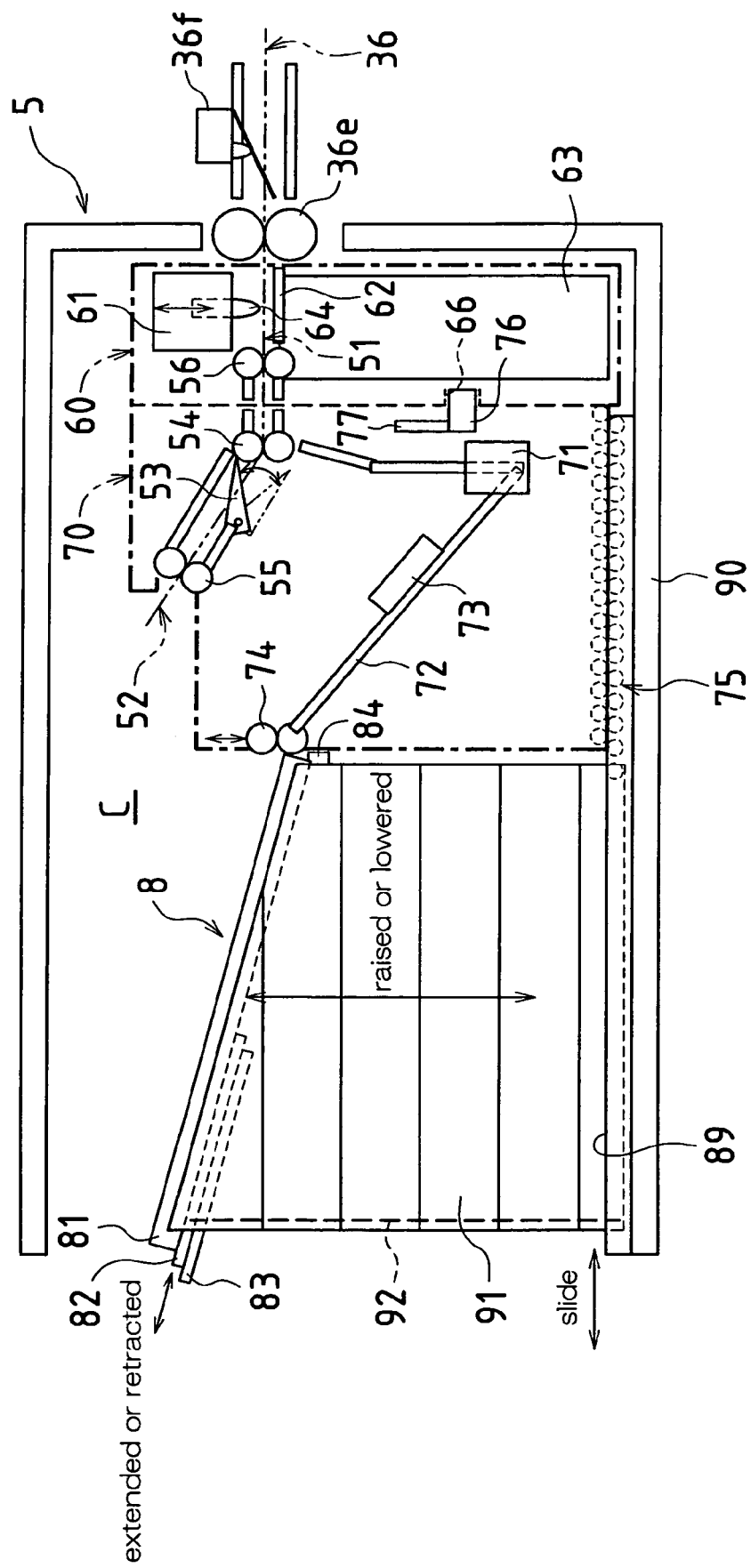
FIG. 2 is a view showing a schematic configuration of a paper post-processing portion and a discharge tray of the compound machine.

The paper transport system 32 is provided with a main transport path 36 and a reverse transport path 37 in the apparatus main body, and a main transport path 51 and a switchback transport path 52 in the paper post-processing portion 5 shown in FIG. 2. The main transport path 36 of the apparatus main body and the main transport path 51 of the paper post-processing portion 5 are connected to each other at discharge rollers 36e of the apparatus main body serving as the boundary. A description of the main transport path 51 and the switchback transport path 52 of the paper post-processing portion 5 is given below. In the compound machine 1, the recording paper is transported through the paper transport system 32 with a so-called center reference. More specifically, the recording paper is transported with the center position of the recording paper in the widthwise direction (the direction perpendicular to the transport direction of the recording paper) used as a reference.

In the apparatus main body, one end side of the main transport path 36 is branched into two, with one branch end being opposed to the discharge side of the paper cassette 33 and the other branch end being opposed to the discharge side of the manual tray 34. Furthermore, the other end side of the main transport path 36 is opposed to a punching unit 60 of the paper post-processing portion 5. One end side of the reverse transport path 37 is connected to the main transport path 36 on the upstream side (the lower side in FIG. 1) of the position at which the transfer roller 31d is disposed, and the other end side is connected to the main transport path 36 on the downstream side (the upper side in FIG. 1) of the position at which the transfer roller 31d is disposed.

A pickup roller 36a with a semicircular-shaped cross section is disposed at one branch end (the portion opposed to the discharge side of the paper cassette 33) of the main transport path 36. Due to rotation of this pickup roller 36a, it is possible to intermittently feed the recording paper accommodated in the paper cassette 33 page by page to the main transport path 36. In a similar manner, a pickup roller 36b with a semicircular-shaped cross section is disposed at the other branch end (the portion opposed to the discharge side of the manual tray 34) of the main transport path 36. Due to rotation of this pickup roller 36b, it is possible to intermittently feed the recording paper placed on the manual tray 34 page by page to the main transport path 36.

Registration rollers 36d are arranged on the upstream side of the position at which the transfer roller 31d is disposed in this main transport path 36. The registration rollers 36d transport recording paper while matching the positions of the recording paper and the toner image on the surface of the photosensitive drum 31b.

On the downstream side of the position at which the transfer roller 31d is disposed on the main transport path 36, a fixing unit 39 is disposed that is provided with a pair of rollers including a hot roller 39a and a pressure roller 39b for fixing the toner image transferred to the recording paper with heat. Furthermore, at the downstream end of the main transport path 36, the discharge rollers 36e for discharging the recording paper to the paper post-processing portion 5 are arranged at the boundary with the main transport path 51 of the paper post-processing portion 5.

A branch catch 38 is disposed at the position at which the upstream end of the reverse transport path 37 is connected to the main transport path 36. This branch catch 38 can rotate around a horizontal axis between a first position (the position indicated by the solid line) in FIG. 1 and a second position that opens the reverse transport path 37 by rotating from the first position in the counterclockwise direction in FIG. 1. When the branch catch 38 is in the first position, recording paper is transported toward the main transport path 51 of the paper post-processing portion 5. When the branch catch 38 is in the second position, recording paper can be fed to the reverse transport path 37.

Transport rollers 37a are arranged on the reverse transport path 37. When the recording paper that has been switch-backed on the switchback transport path 52 in the paper post-processing portion 5 is fed to the reverse transport path 37, the recording paper is transported by the transport rollers 37a, so that the recording paper is guided onto the main transport path 36 on the upstream side of the registration rollers 36d to be transported on the main transport path 36 again toward the transfer roller 31d. More specifically, an image can be formed on the rear face of the recording paper.

Description of the Original Automatic Feed portion 4

The original automatic feed portion 4 is configured as a so-called automatic duplex original transport apparatus. The original automatic feed portion 4 can be used as a sheet moving system, and is provided with an original tray 43 as an original placement portion, a middle tray 44, an original discharge tray 45 as an original discharge portion, and an original transport system 46 that transports an original between the trays 43, 44, and 45.

The original transport system 46 is provided with a main transport path 47 for transporting an original that has been placed on the original tray 43 via the original reading portion 42 to the middle tray 44 or the original discharge tray 45, and a sub transport path 48 for feeding an original on the middle tray 44 to the main transport path 47.

An original pickup roller 47a and a stacking roller 47b are arranged at the upstream end (the portion opposed to the discharge side of the original tray 43) of the main transport path 47. A stacking plate 47c is disposed on the lower side of the stacking roller 47b. In accordance with rotation of the original pickup roller 47a, one page of the original on the original tray 43 passes between the stacking roller 47b and the stacking plate 47c and is fed to the main transport path 47. PS rollers 47e and 47e are arranged on the downstream side of a linking portion (portion B in FIG. 1) between the main transport path 47 and the sub transport path 48. These PS rollers 47e and 47e adjust the leading edge of the original and the image read timing of the scanner portion 2 and feed the original to the original reading portion 42. More specifically, the PS rollers 47e and 47e temporarily stop transport of the original with the original in a fed state, adjust the above-described timing, and feed the original to the original reading portion 42.

The original reading portion 42 is provided with a glass platen 42a and an original pressing plate 42b, and when the original fed from the PS rollers 47e and 47e passes between the glass platen 42a and the original pressing plate 42b, light from the exposing light source 21 passes through the glass platen 42a and is irradiated onto the original. At this time, original image data is acquired by the scanner portion 2.

Biasing force is conferred on the rear face (top face) of the original pressing plate 42b by an unshown coil spring. Thus, the original pressing plate 42b is in contact with the glass platen 42a with a predetermined pressure, and when the original passes the original reading portion 42, the original is prevented from rising up from the glass platen 42a.

Transport rollers 47f and original discharge rollers 47g are provided on the downstream side of the glass platen 42a. An original that has passed on the glass platen 42a passes the transport rollers 47f and the original discharge rollers 47g and is discharged to the middle tray 44 or the original discharge tray 45.

A middle tray swinging plate 44a is disposed between the original discharge rollers 47g and the middle tray 44. The middle tray swinging plate 44a swings centered on the end portion on the side of the middle tray 44, and can swing between a position 1 (the position indicated by the solid line) in FIG. 1 and a position 2 flipped upward from the position 1. When the middle tray swinging plate 44a is in the position 2, an original that has been discharged from the original discharge rollers 47g is recovered to the original discharge tray 45. On the other hand, when the middle tray swinging plate 44a is in the position 1, an original that has been discharged from the original discharge rollers 47g is discharged to the middle tray 44. When paper is discharged to the middle tray 44, the marginal edge of the original is in a state sandwiched between the original discharge rollers 47g and 47g, the original is fed to the sub transport path 48 by the reverse rotation of the original discharge rollers 47g from this state, and the original is sent via this sub transport path 48 again onto the main transport path 47. This reverse rotation operation of the original discharge rollers 47g is performed such that the timing for sending the original onto the main transport path 47 and the image read timing are adjusted. Accordingly, an image on the rear face of the original is read by the image reading portion 42.

Description of the Paper Post-Processing Portion 5 and the Discharge Tray 8

The paper post-processing portion 5 makes it possible to perform a plurality of types of paper post-processing such as punching processing and staple processing for the recording paper that is discharged from the apparatus main body after print processing is finished. Such paper post-processing in the paper post-processing portion 5 is, as described below, performed when there is a request for paper post-processing as a print condition when a print request has been made.

In this example, a configuration is adopted in which the paper post-processing portion 5 and the discharge tray 8 are provided using a space C formed by the apparatus main body of the compound machine 1 instead of providing them outside the apparatus main body. More specifically, the apparatus main body of the compound machine 1 adopts a configuration in which the paper cassette 33, the image forming portion 3 (the image forming system 31), and the scanner portion 2 are arranged in approximately the shape of a U, and the paper post-processing portion 5 and the discharge tray 8 are provided in the internal U-shaped space C formed by this apparatus main body. Accordingly, it is possible to arrange the paper post-processing portion 5 and the discharge tray 8 in a limited space within the compound machine 1, and a plurality of types of paper post-processing can be performed for the recording paper. Furthermore, the area occupied by the compound machine 1 provided with the paper post-processing portion 5 is suppressed and it is possible to achieve space conservation.

Hereinafter, the paper post-processing portion 5 and the discharge tray 8 are described in detail using FIGS. 2 to 6. It should be noted that the transport direction (the direction shown in FIG. 3) of recording paper is referred to as a "paper transport direction", and the widthwise direction (the direction shown in FIG. 3) of recording paper perpendicular to the paper transport direction is referred to as a "paper widthwise direction".

As shown in FIG. 2, the paper post-processing portion 5 is disposed on the downstream side of the discharge rollers 36e of the apparatus main body. The punching unit 60 provided with a hole-punching function and a staple unit 70 provided with a staple function are arranged as a paper post-processing unit in the paper post-processing portion 5. The front face (face on the near side) of the paper post-processing portion 5 is covered by a cover 50 that can be opened and closed. In the paper post-processing portion 5, the punching unit 60 is disposed on the upstream side and the staple unit 70 is disposed on the downstream side. On the downstream side of the paper post-processing portion 5, the discharge tray 8 is disposed. The recording paper that is discharged from the discharge rollers 36e passes the punching unit 60 and the staple unit 70 and is discharged to the discharge tray 8. The discharge tray 8 is used as a paper holding portion for staple processing when staple processing is performed with the staple unit 70 of the paper post-processing portion 5.

Description of the Punching Unit 60

The punching unit 60 performs hole-punching processing (punching processing) for the recording paper that is discharged from the discharge rollers 36e. The punching unit 60 is provided with a hole-punching mechanism portion 61, a guide plate 62, and a punch waste accommodating box 63, for example. Furthermore, as the paper transport system 32 described above, the main transport path 51 is formed. In the punching unit 60, transport rollers 56 are arranged on the main transport path 51. It should be noted that unlike the staple unit 70 described below, the punching unit 60 is fixed on the apparatus main body.

In the punching unit 60, if there is a request for punching processing as a print condition when a print request has been made, then recording paper that has been transported to the punching unit 60 is stopped on the guide plate 62 and punch holes are made page by page with the hole-punching mechanism portion 61. A configuration is adopted in which at that time, punch holes are made at positions determined based on the printing paper size.

The hole-punching mechanism portion 61 is disposed in the upper portion of the punching unit 60. The hole-punching mechanism portion 61 is provided with two core members 64 with a diameter corresponding to the diameter of a punch hole, at locations with a predetermined spacing therebetween in the paper widthwise direction. The core members 64 are arranged such that they can be vertically raised or lowered, and make punch holes through the recording paper when the core members 64 are lowered. Furthermore, the core members 64 are arranged such that they can move back and forth in the direction along the paper transport direction and in the direction along the paper widthwise direction, so that it is possible to match the position when punching processing is performed, as described below.

The guide plate 62 is disposed below the hole-punching mechanism portion 61. Opening portions corresponding to predetermined positions at which punch holes are made are formed on the guide plate 62. The punch waste accommodating box 63 is disposed in the lower portion of the punching unit 60, so that the punch waste accommodating box 63 recovers punch waste generated in hole-punching processing. The punch waste accommodating box 63 is disposed such that it can slide in the paper widthwise direction, so that it can be removed to the near side when the cover 50 is opened as described below. Accordingly, punch waste accommodated in the punch waste accommodating box 63 can be removed.

When punching processing is performed with the punching unit 60, the core members 64 of the hole-punching mechanism portion 61 are moved to positions corresponding to the above-described positions determined based on the printing paper size.

In addition to the above, the core members 64 of the hole-punching mechanism portion 61 of the punching unit 60 can be moved for fine adjustment such that punch holes can be accurately made at the above-described positions determined based on the printing paper size. A description of the fine adjustment movement has been omitted.

Description of the Staple Unit 70

The staple unit 70 performs staple processing for the recording paper that is transported from the punching unit 60 on the upstream side. The staple unit 70 is disposed such that it can slide in the direction along the paper transport direction when the cover 50 is opened upward so as to be opened in the near direction. Furthermore, the staple unit 70 is disposed such that it can be engaged with or removed from the punching unit 60 disposed on the upstream side of the staple unit 70, as described below.

The staple unit 70 is provided with a staple mechanism portion 71, a staple stage 72, adjusting plates 73, and discharge rollers 74, for example. Furthermore, as the paper transport system 32 described above, the main transport path 51 and the switchback transport path 52 are formed. In the staple unit 70, a branch catch 53 for switching the direction in which recording paper is guided and discharge rollers 54 for discharging recording paper to the staple stage 72 are provided at the position at which the downstream side on the main transport path 51 is connected to the upstream side on the switchback transport path 52. Furthermore, switchback rollers 55 are provided on the downstream side on the switchback transport path 52.

In the staple unit 70, if there is a request for staple processing as a print condition when a print request has been made, then the staple mechanism portion 71 performs staple processing for a predetermined number of pages of recording paper placed on the staple stage 72. At this time, staple processing is performed at the position determined based on the printing paper size and a desired staple position. The desired staple position refers to the position at which staple processing desired by a user is performed, such as fastening at one location in the upper left corner portion of the recording paper or fastening at two locations in the left end portion, for example.

The staple mechanism portion 71 is disposed below the discharge rollers 54, and binds the trailing end portion of recording paper placed on the staple stage 72 with staples. The staple mechanism portion 71 is configured such that it can move back and forth in the paper widthwise direction, so that staple processing can be performed at the above-described position determined based on the printing paper size and the desired staple position. When staple processing is performed with the staple unit 70, the staple mechanism portion 71 is moved to a position corresponding to the above-described position determined based on the printing paper size and the desired staple position.

Recording paper discharged from the discharge rollers 54 is placed on the staple stage 72, and the staple stage 72 serves as a processing stage for staple processing performed by the staple mechanism portion 71. The staple stage 72 is disposed with the downstream side in the paper transport direction sloped upward. When staple processing is performed, the recording paper discharged from the discharge rollers 54 slides along the slope of the staple stage 72 to the upstream side in the paper transport direction due to the paper's own weight. On the other hand, when staple processing is not performed, the recording paper is discharged from the discharge rollers 74 to the discharge tray 8.

The adjusting plates 73 are arranged so as to be opposed to each other on both sides of the top face (the face on which the recording paper is discharged) of the staple stage 72 in the direction along the paper widthwise direction. A pair of adjusting plates 73 is arranged such that they can move back and forth in the paper widthwise direction. When staple processing is performed with the staple unit 70, by moving the adjusting plates 73 in the paper widthwise direction, adjustment in the paper widthwise direction is performed for each page of recording paper discharged onto the staple stage 72. At this time, the adjusting plates 73 are moved in accordance with a movable width determined based on the printing paper size, that is, based on the size of the recording paper that is being transported. The back and forth movement of the pair of adjusting plates 73 is, for example, possible with a rack and pinion mechanism.

Description of the Discharge Tray 8

The discharge tray 8 is disposed, together with the paper post-processing portion 5 described above, in the internal U-shaped space C formed by the apparatus main body of the compound machine 1. Recording paper on which paper post-processing such as punching processing and staple processing has been performed in the paper post-processing portion 5 is discharged to the discharge tray 8. The discharge tray 8 is disposed such that it can be extended or retracted in the paper transport direction (the direction in which recording paper is discharged). Furthermore, it is disposed such that it can be vertically raised or lowered. In addition, it is disposed such that it can slide with respect to the apparatus main body.

Figure 3:
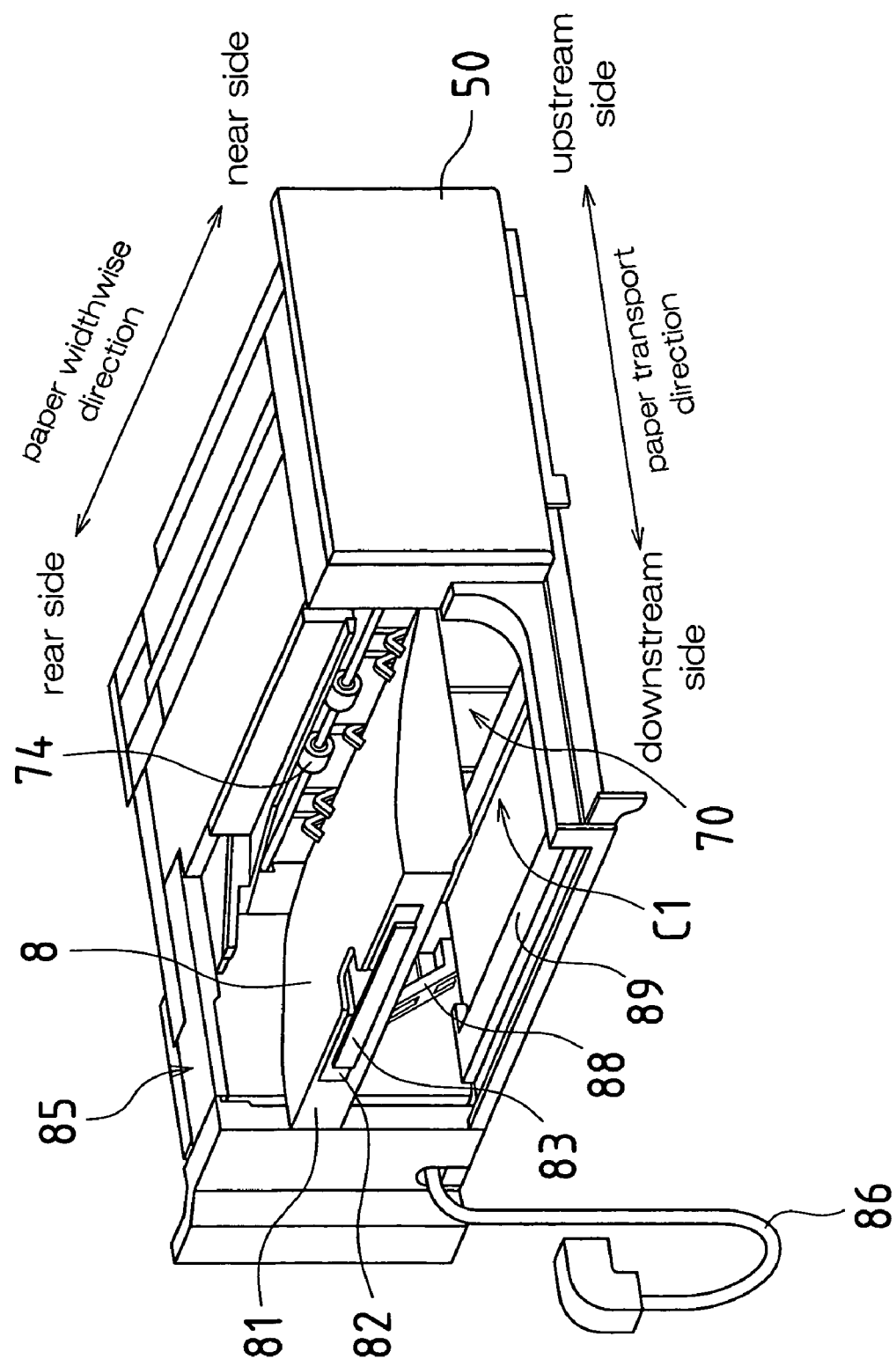
FIG. 3 is a perspective view showing the paper post-processing portion and the discharge tray of the compound machine, illustrating a state in which the discharge tray is retracted and raised and in which a cover is closed.
Figure 5:
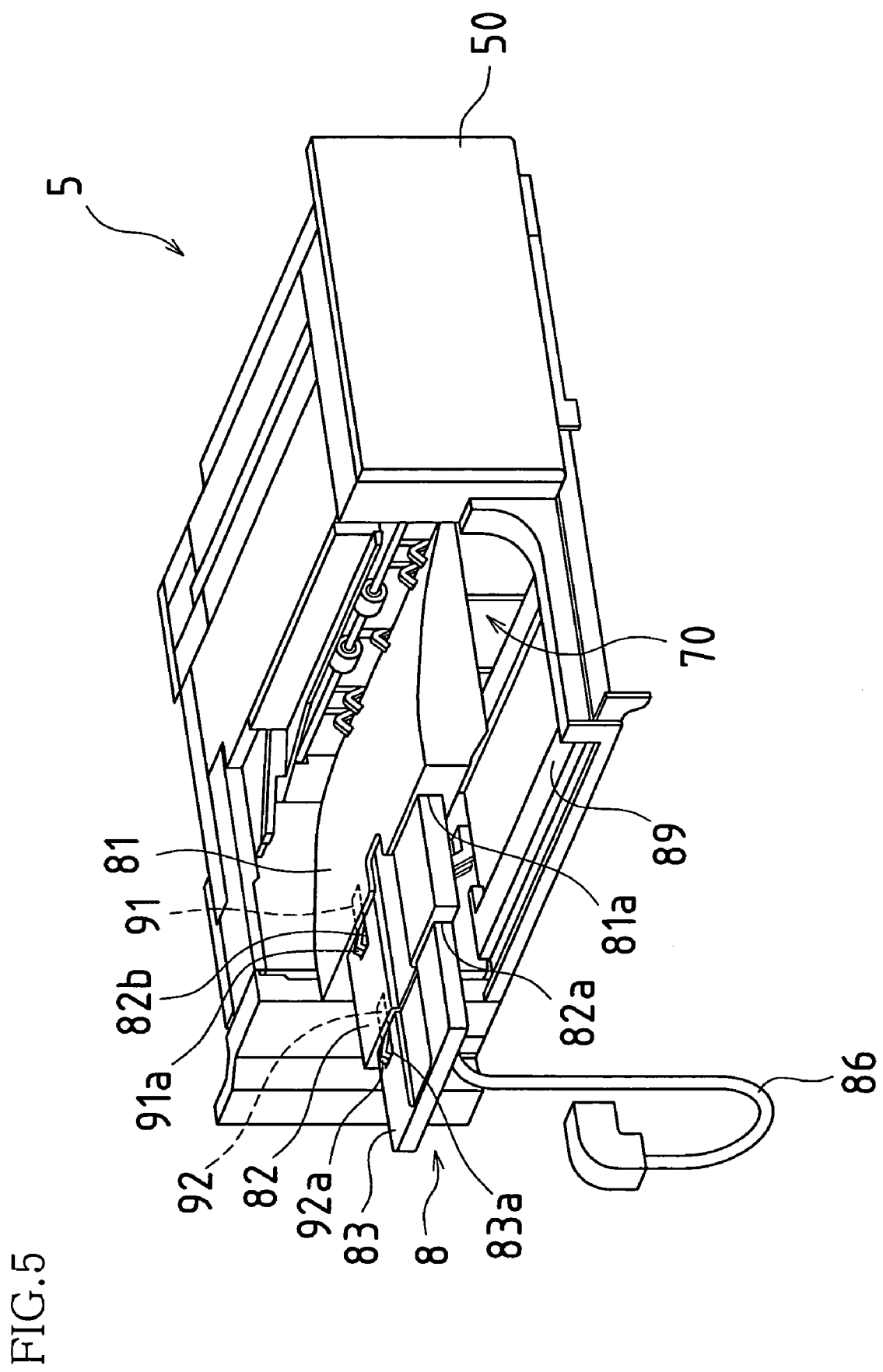
FIG. 5 is a perspective view showing a state in which the discharge tray of the compound machine is extended.
Figure 6:
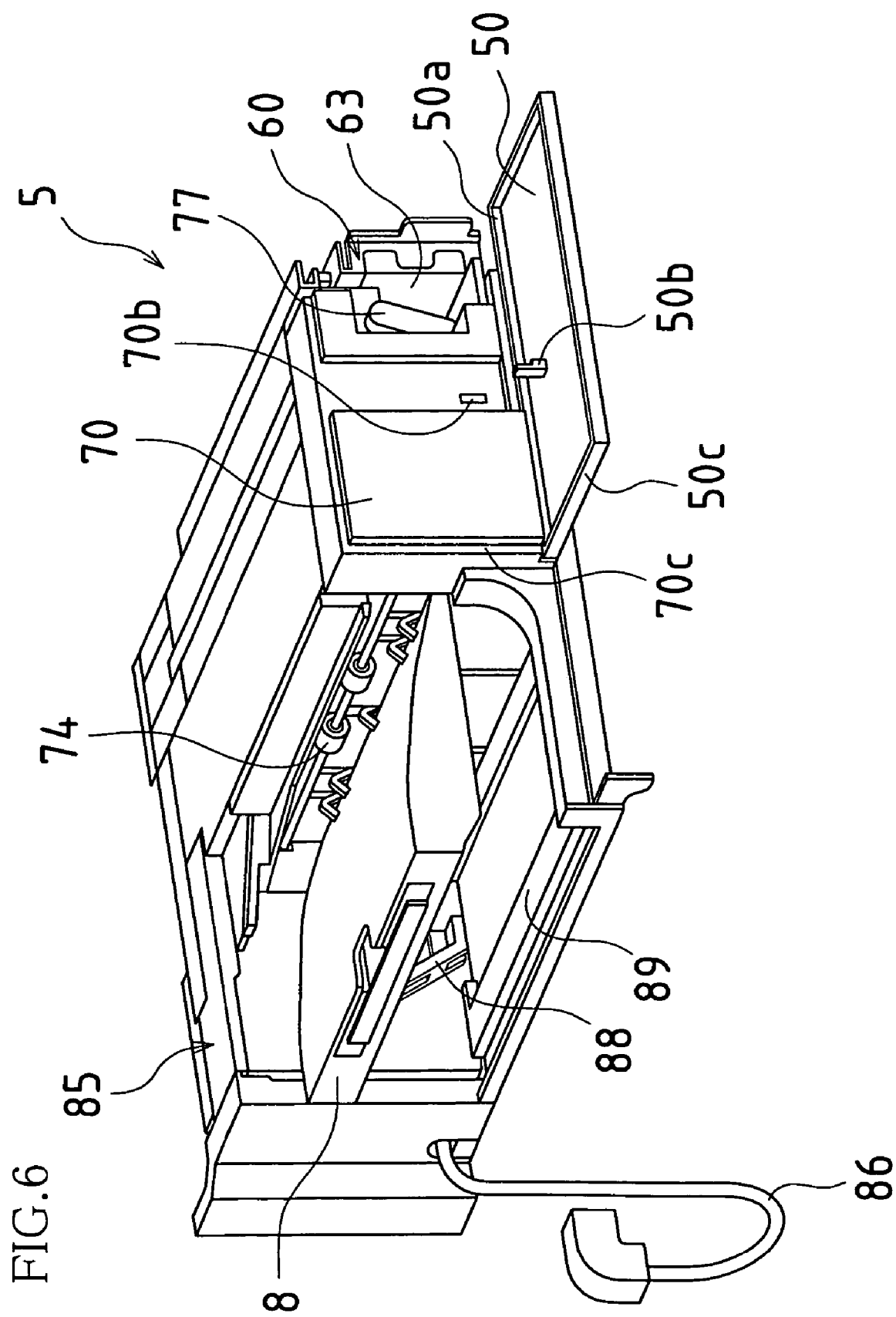
FIG. 6 is a perspective view showing a state in which the cover of the compound machine is open.

As shown in FIGS. 3 and 5, the discharge tray 8 is formed as a tray that can be extended or retracted within a range of one to three stages in the direction along the paper transport direction. In this example, the discharge tray 8 is configured such that it can be manually extended or retracted in the paper transport direction by a user in accordance with the printing paper size.

The discharge tray 8 is provided with a first discharge tray 81, a second discharge tray 82, and a third discharge tray 83. The first discharge tray 81 is a tray of the largest size and is disposed closest to the paper post-processing portion 5. The first discharge tray 81 is formed to have a length that does not project from the lateral face (lateral wall) of the compound machine 1. The first discharge tray 81 is integrally attached to the apparatus main body, and has a structure in which a movement in the direction along the paper transport direction is impossible.

The second discharge tray 82 is a tray of a medium size and is accommodated in an accommodating portion 81a formed in the first discharge tray 81. The second discharge tray 82 is disposed such that it can move forward and backward in the direction along the paper transport direction. The third discharge tray 83 is a tray of the smallest size and is accommodated in an accommodating portion 82a formed in the second discharge tray 82. The third discharge tray 83 is disposed such that it can move forward and backward in the direction along the paper transport direction.

As shown in FIG. 3, in a state where the discharge tray 8 is retracted to only one stage, the length in the direction along the paper transport direction of the discharge tray 8 is the shortest, the third discharge tray 83 is completely accommodated in the second discharge tray 82, and the second discharge tray 82 is completely accommodated in the first discharge tray 81. At that time, the length in the direction along the paper transport direction of the discharge tray 8 is equal to the length in the direction along the paper transport direction of the first discharge tray 81, and is the length that does not project from the lateral face of the compound machine 1. A configuration is adopted in which the discharge tray 8 does not project from the apparatus main body in this manner in a state where the discharge tray 8 is retracted most, so that the discharge tray 8 can be accommodated in a space of the apparatus main body when the compound machine 1 is not used.

On the contrary, as shown in FIG. 5, in a state where the discharge tray 8 is extended to three stages, the length in the direction along the paper transport direction of the discharge tray 8 is the longest, the second discharge tray 82 projects to a maximum extent from the first discharge tray 81, and the third discharge tray 83 projects to a maximum extent from this second discharge tray 82. At that time, the length in the direction along the paper transport direction of the discharge tray 8 is longer than the length in the paper transport direction of recording paper of the largest size (such as A3 horizontal size) that can be printed with the compound machine 1. Accordingly, when the discharge tray 8 is extended to a maximum length, even recording paper of the largest size (such as A3 horizontal size) that can be printed can be stably placed. As described below, the discharge tray 8 is configured such that it can slide together with the staple unit 70. Even when the discharge tray 8 is led to slide in a state where recording paper is placed on the discharge tray 8, the recording paper does not fall from the discharge tray 8.

As described above, the discharge tray 8 is disposed such that it can be extended or retracted in the direction along the paper transport direction, and thus it is possible to use the discharge tray 8 after adjusting it to an optimal length in accordance with the printing paper size.

Furthermore, an opening portion 82b is formed in the vicinity of the base end portion on the upper face of the second discharge tray 82, and an operation lever 91a of a first paper detection sensor 91 is disposed so as to project upward from the opening portion 82b. The operation lever 91a is biased such that it always projects upward, and when the second discharge tray 82 is accommodated in the first discharge tray 81, the operation lever 91a is pressed downward by the upper face of the internal wall of the first discharge tray 81. Then, when the second discharge tray 82 is completely pulled out from the first discharge tray 81 (in a state shown in FIG. 5), the operation lever 91a rotates to return to the normal position projecting upward from the opening portion 82b. In this embodiment, the first paper detection sensor 91 is disposed so as to be off in a state where the operation lever 91a projects upward, and so as to be on in a state where the operation lever 91a is pressed downward by the upper face of the internal wall of the first discharge tray 81.

In a similar manner, an opening portion 83a is formed in the vicinity of the base end portion on the upper face of the third discharge tray 83, and an operation lever 92a of a second paper detection sensor 92 is disposed so as to project upward from the opening portion 83a. The operation lever 92a is biased such that it always projects upwards, and when the third discharge tray 83 is accommodated in the second discharge tray 82, the operation lever 92a is pressed downward by the upper face of the internal wall of the second discharge tray 82. Then, when the third discharge tray 83 is completely pulled out from the second discharge tray 82 (in a state shown in FIG. 5), the operation lever 92a rotates to return to the normal position projecting upward from the opening portion 83a. In this embodiment, the second paper detection sensor 92 is disposed so as to be off in a state where the operation lever 92a projects upward, and so as to be on in a state where the operation lever 92a is pressed downward by the upper face of the internal wall of the second discharge tray 82.

In other words, the first paper detection sensor 91 and the second paper detection sensor 92 are off in a state where the trays 82 and 83 are pulled out, and when recording paper after printing is discharged and placed on the trays 82 and 83, the placed recording paper presses down the operation levers 91a and 92a downward, resulting that the first paper detection sensor 91 and the second paper detection sensor 92 are turned on. Then, they are turned off again when the recording paper after printing is taken out of the discharge tray 8 by a user. Accordingly, it is possible to detect whether or not there is recording paper on the discharge tray 8.

Furthermore, the first and the second paper detection sensors 91 and 92 can be used also as extension/retraction detection sensors that detect whether or not the second discharge tray 82 and the third discharge tray 83 are pulled out before printing is started. More specifically, before printing is started, if the first paper detection sensor 91 is on, then it can be determined that the second discharge tray 82 is not pulled out from the first discharge tray 81, and if the first paper detection sensor 91 is off, then it can be determined that the second discharge tray 82 is pulled out from the first discharge tray 81. Furthermore, before printing is started, if the second paper detection sensor 92 is on, then it can be determined that the third discharge tray 83 is not pulled out from the second discharge tray 82, and if the second paper detection sensor 92 is off, then it can be determined that the third discharge tray 83 is pulled out from the second discharge tray 82.

Figure 4:
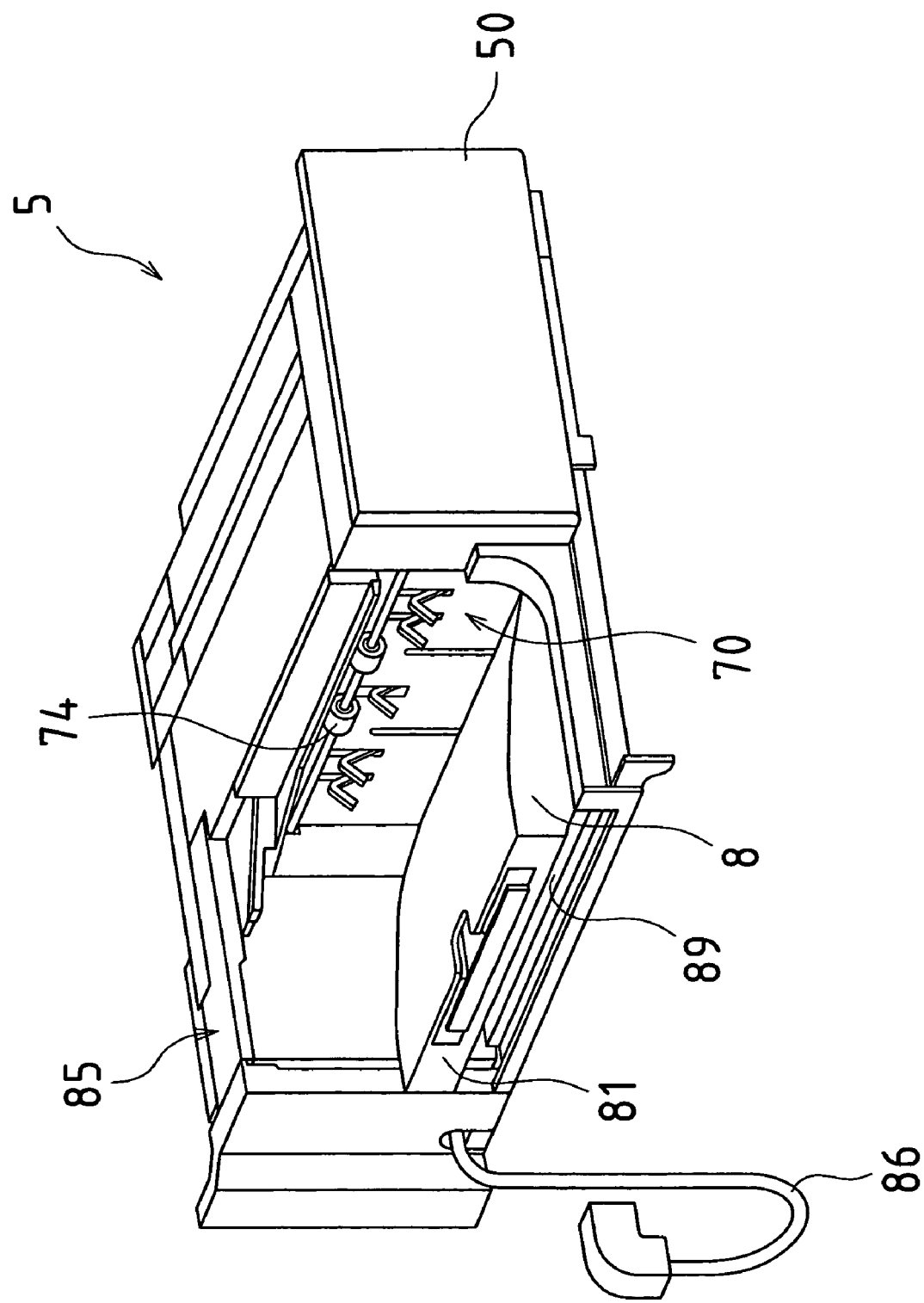
FIG. 4 is a perspective view showing a state in which the discharge tray of the compound machine is lowered.

Furthermore, as shown in FIGS. 3 and 4, the discharge tray 8 is formed as a tray that can be vertically raised or lowered. In this example, a configuration is adopted in which the discharge tray 8 is raised or lowered in accordance with the amount (the number of pages) of recording paper placed thereon.

The amount of recording paper that is discharged to the discharge tray 8 is detected by an upper limit sensor 84 provided in the vicinity of the discharge roller 74 on the lower side. The upper limit sensor 84 is provided as a contact-type sensor. When the uppermost face of the recording paper that is placed on the discharge tray 8 reaches a predetermined height, the upper limit sensor 84 is turned on. Accordingly, it is detected that the discharge tray 8 is full. When a full state is detected in this manner, the discharge tray 8 is lowered only by a predetermined distance. When the discharge tray 8 is lowered in this manner, the upper limit sensor 84 is turned off. The amount of the recording paper that is placed on the discharge tray 8 is detected based on a switching between on/off of the upper limit sensor 84. In this example, the home position of the discharge tray 8 is set at the position (the position shown in FIG. 3) obtained by raising the discharge tray 8 to the uppermost, and the end portion on the upstream side on the discharge tray 8 is disposed directly below the discharge rollers 74. A configuration is adopted in which the discharge tray 8 is gradually lowered as the amount of recording paper placed on the discharge tray 8 increases. It should be noted that the upper limit sensor 84 may be provided as an optical sensor.

As described above, the discharge tray 8 is disposed such that it can be extended or retracted, and it is raised or lowered, the first discharge tray 81 is raised or lowered, and the second discharge tray 82 and the third discharge tray 83 are raised or lowered together with the first discharge tray 81.

The first discharge tray 81 is raised or lowered in the following manner, for example. A drive portion 85 for raising or lowering the first discharge tray 81 is disposed on the rear side of the first discharge tray 81. A drive belt (not shown) is accommodated in the drive portion 85, and the drive belt can be driven by an unshown electric power source for driving, which is connected to a wiring 86. A support member for supporting the front-end portion of the first discharge tray 81 is connected to the drive portion 85. The support member is disposed such that it vertically moves back and forth by driving the drive belt. Then, a motive power of the drive belt in the drive portion 85 is transmitted via the support member to the first discharge tray 81, so that the first discharge tray 81 is raised or lowered. Furthermore, an arm 88 for supporting the first discharge tray 81 is provided in the lower portion of the first discharge tray 81. The arm 88 is disposed between the first discharge tray 81 and a bottom portion 89. The arm 88 is disposed so as to be bent in the shape of an L, and the bending angle can be changed. The bending degree of the arm 88 changes in accordance with the position to which the first discharge tray 81 has been raised or lowered. Protrusions are arranged at the end portion, closer to the paper post-processing portion 5, of the first discharge tray 81. The protrusions are engaged with vertically extending groove portions arranged on the paper post-processing portion 5, such that the protrusions can slide in the groove portions.

The entire description of the compound machine 1 has been given above.

Figure 7:
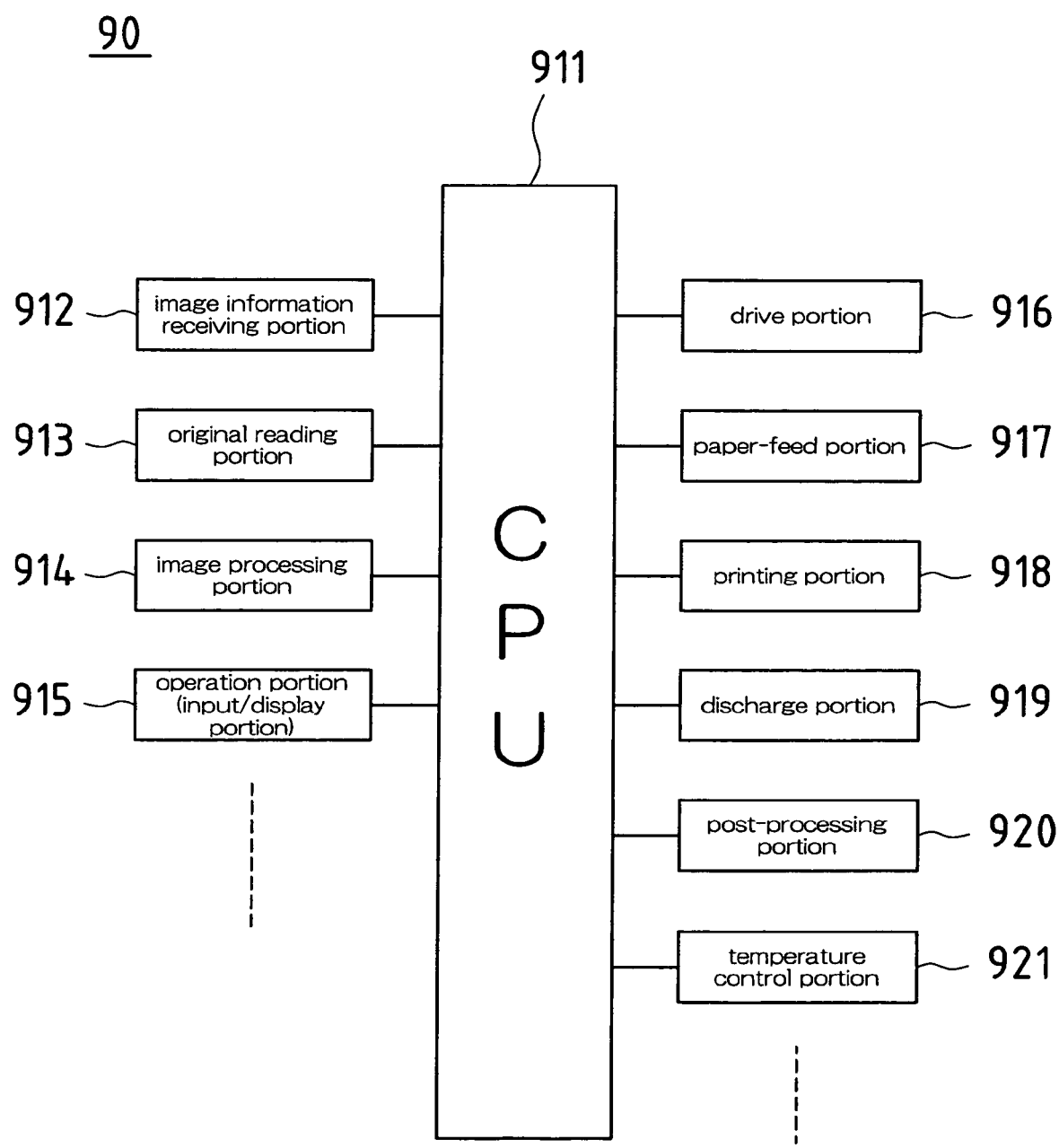
FIG. 7 is a functional block diagram showing the configuration of a main portion of a control portion that accommodates, for example, a circuit substrate for controlling an image forming process of the compound machine according to this embodiment and an interface substrate for receiving image data from an external device.

FIG. 7 is a functional block diagram showing the configuration of a main portion of a control portion that accommodates, for example, a circuit substrate for controlling an image forming process of the thus configured compound machine 1 and an interface substrate for receiving image data from an external device.

A control portion 90 is constituted mainly by a CPU 911, which is a central processing unit, and also by an image information receiving portion 912, an original reading portion 913, an image processing portion 914, an operation portion (input/display portion) 915, a drive portion 916, a paper-feed portion 917, a printing portion 918, a discharge portion 919, a post-processing portion 920, and a temperature control portion 921. Herein, the first paper detection sensor 91 and the second paper detection sensor 92 described above are included in the discharge portion 919.

Figure 8:
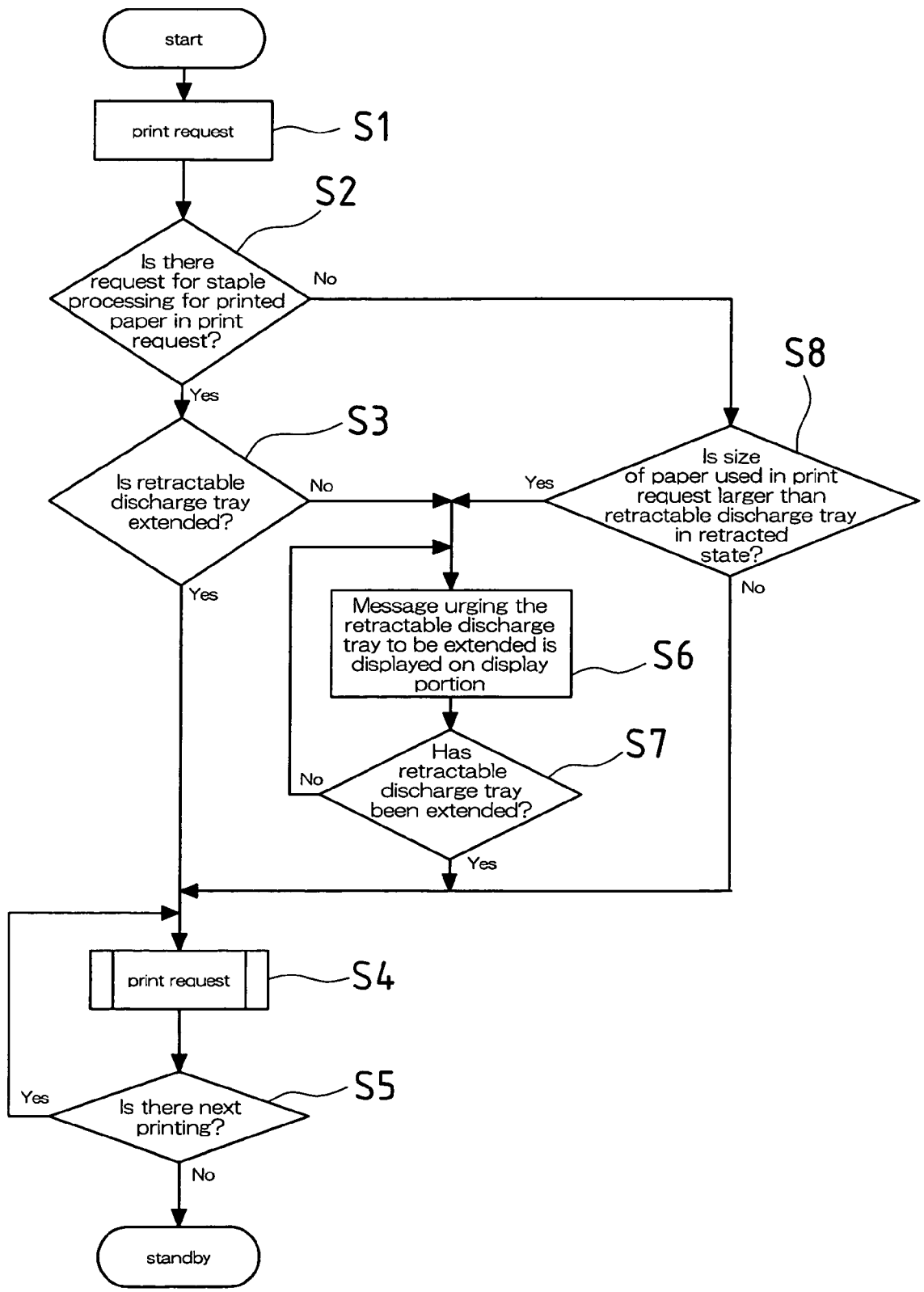
FIG. 8 is a flowchart for illustrating a print processing operation by the control portion of the compound machine when a print request has been made.

Next, referring to a flowchart shown in FIG. 8, a print processing operation by the control portion 90 when a print request has been made is described.

When a user operates the operation portion 915 such as a liquid crystal display panel of the apparatus main body to set various print contents (such as the paper type, the number of pages to be printed, and whether or not post-processing is to be performed), so that a print request is made (step S1), then the control portion 90 first confirms whether or not there is a request for staple processing for printed paper (step S2). If the result shows that there is a request for staple processing (if determined to be Yes in step S2), then a detection state (on/off state) of the first and the second paper detection sensors 91 and 92 is confirmed, so that it is determined whether or not the discharge tray 8 is extended as described above (step S3). If the result shows that the discharge tray 8 is extended, that is, if at least either one of the first paper detection sensor 91 and the second paper detection sensor 92 is off (if determined to be Yes in step S3), then print processing is started as it is (step S4), and when the print processing is performed to the last (if determined to be Yes in step S5), then the procedure returns to a standby state until the next print request is made.

On the other hand, if there is a request for staple processing and if the discharge tray 8 is retracted, that is, if both of the first paper detection sensor 91 and the second paper detection sensor 92 are on (if determined to be Yes in step S2 and No in step S3), then the control portion 90 displays a message urging the discharge tray 8 to be extended, on the liquid crystal display panel of the operation portion 915 (step S6) and monitors the first paper detection sensor 91 and the second paper detection sensor 92, so as to monitor whether or not at least either one of the sensors is switched from on to off (step S7). If the user looking at this warning message extends the discharge tray 8 and thus at least either one of the first paper detection sensor 91 and the second paper detection sensor 92 is switched from on to off (if determined to be Yes in step S7), then the control portion 90 starts print processing (step S4), and when the print processing is performed to the last (if determined to be Yes in step S5), then the procedure returns to a standby state until the next print request is made.

On the other hand, if there is no request for staple processing in step S2 (if determined to be No), then it is determined whether or not the size of paper on which a print request has been made is longer than the discharge tray 8 in a retracted state (that is, whether or not it is the size at which the paper cannot be placed on the discharge tray 8 unless it is used in an extended state), based on the print contents set by the user (step S8). More specifically, when the discharge tray 8 in a retracted state corresponds to the A4 vertical size, if recording paper with a size of B4 vertical or A3 vertical is used, then it is determined to be Yes in step S8. If determined to be Yes in step S8 in this manner, then the control portion 90 displays a message urging the discharge tray 8 to be extended, on the liquid crystal display panel of the operation portion 915 (step S6) and monitors the first paper detection sensor 91 and the second paper detection sensor 92, so as to monitor whether or not at least either one of the sensors is switched from on to off (step S7). If the user looking at this warning message extends the discharge tray 8 and thus at least either one of the first paper detection sensor 91 and the second paper detection sensor 92 is switched from on to off (if determined to be Yes in step S7), then the control portion 90 starts print processing (step S4), and when the print processing is performed to the last (if determined to be Yes in step S5), then the procedure returns to a standby state until the next print request is made.

On the other hand, if it is determined that the size of paper on which a print request has been made is equal to or shorter than the discharge tray 8 in a retracted state in step S8 (if determined to be No in step S8), then print processing is started as it is (step S4), and when the print processing is performed to the last (if determined to be Yes in step S5), then the procedure returns to a standby state until the next print request is made.

It should be noted that although when a print request has been made, first it is confirmed whether or not there is staple processing to be performed (step S2), and then the size of paper on which a print request has been made is confirmed (step S3) in the above description on the operation, this order may be in reverse. Furthermore, in the above description on the operation, a configuration is adopted in which a warning message is displayed on a liquid crystal display panel as a warning portion, but the warning portion is not limited to this, and it is possible to give warning, for example, by letting an LED or other components flicker (or operate), or letting an electronic buzzer make a buzzer sound, and a use of them in combination is also possible.

The present invention can be embodied and practiced in other different forms without departing from the spirit and essential characteristics thereof. Therefore, the above-described embodiments are considered in all respects as illustrative and not restrictive. The scope of the invention is indicated by the appended claims rather than by the foregoing description. All variations and modifications falling within the equivalency range of the appended claims are intended to be embraced therein.

What is claimed is:

1. An image forming apparatus having a configuration in which an original reading portion is disposed in an upper portion of an apparatus main body, a paper-feed portion is disposed in a lower portion of the apparatus main body, a printing portion is disposed between the original reading portion and the paper-feed portion, a paper post-processing portion is disposed in a space portion of the apparatus main body formed by the original reading portion, the printing portion, and the paper-feed portion, and a discharge tray portion that can be extended and retracted, to which recording paper after post-processing is discharged, is disposed on a downstream side of the paper post-processing portion; and a single sensor that determines whether the discharge tray portion is extended/retracted and whether recording paper is located on the discharge tray portion, wherein a control portion performs print processing after confirming an extended/retracted state of the discharge tray portion, based on the sensor, a type of recording paper that is to be used and presence/absence of a request for post-processing by the paper post- processing portion, when a print request has been made.

2. The image forming apparatus according to claim 1, wherein the control portion confirms an extended/retracted state of the discharge tray portion when a type of recording paper that is to be used is a paper size with which it is necessary to extend the discharge tray portion.

3. The image forming apparatus according to claim 1, wherein the control portion confirms an extended/retracted state of the discharge tray portion when a request for post-processing by the paper post-processing portion is a request for staple processing.

4. The image forming apparatus according to claim 1, wherein a warning portion is provided that gives warning so as to extend the discharge tray portion when a result of a confirmation of an extended/retracted state of the discharge tray portion shows that the discharge tray portion is retracted.

5. The image forming apparatus according to claim 1, wherein an extended/retracted state of the discharge tray portion is confirmed based on a detection signal from an extension/retraction detection sensor for detecting extension/retraction of the discharge tray portion.

6. The image forming apparatus according to claim 4, wherein an extended/retracted state of the discharge tray portion is confirmed based on a detection signal from an extension/retraction detection sensor for detecting extension/retraction of the discharge tray portion.

7. The image forming apparatus according to claim 2, wherein a warning portion is provided that gives warning so as to extend the discharge tray portion when a result of a confirmation of an extendedlretracted state of the discharge tray portion shows that the discharge tray portion is retracted.

8. The image forming apparatus according to claim 3, wherein a warning portion is provided that gives warning so as to extend the discharge tray portion when a result of a confirmation of an extended/retracted state of the discharge tray portion shows that the discharge tray portion is retracted.

9. The image forming apparatus according to claim 2, wherein an extended/retracted state of the discharge tray portion is confirmed based on a detection signal from an extension/retraction detection sensor for detecting extension/retraction of the discharge tray portion.

10. The image forming apparatus according to claim 3, wherein an extended/retracted state of the discharge tray portion is confirmed based on a detection signal from an extension/retraction detection sensor for detecting extension/retraction of the discharge tray portion.

11. The image forming apparatus according to claim 1, wherein said single sensor is a paper detection sensor that detects whether recording paper is located on the discharge tray potion, and the extended/retracted state of the discharge tray portion is determined according to a state detected by the paper detection sensor.

* * * * *